United States Patent
Hsu

(10) Patent No.: US 6,779,434 B2
(45) Date of Patent: Aug. 24, 2004

(54) STRUCTURE FOR WARMING CUPS IN A COFFEE MAKER

(75) Inventor: Tony Hsu, Yun Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/216,376

(22) Filed: Aug. 12, 2002

(65) Prior Publication Data

US 2004/0025704 A1 Feb. 12, 2004

(51) Int. Cl.[7] ................................................. A47J 31/00
(52) U.S. Cl. ............................. 99/288; 99/290; 16/262; 16/267
(58) Field of Search ..................... 99/288, 290; 16/267, 16/268, 262, 257

(56) References Cited

U.S. PATENT DOCUMENTS

| | | | | |
|---|---|---|---|---|
| 3,338,609 A | * | 8/1967 | Banas | 16/229 |
| 5,881,150 A | * | 3/1999 | Persson | 379/433.13 |
| 6,330,849 B1 | * | 12/2001 | Chao | 99/288 |

\* cited by examiner

*Primary Examiner*—Reginald L. Alexander
(74) *Attorney, Agent, or Firm*—Rosenberg, Klein & Lee

(57) ABSTRACT

A structure for warming cups in a coffee maker includes a pot and a lid. A pivot section is provided to a heating area of the pot. An insertion hole is respectively provided on both side walls in the pivot section of the pot. Another pivot section is provided to the lid with an elastic rod sandwiched between both side walls in the pivot section of the lid. An insertion bead is respectively provided to both ends of the elastic rod to be inserted into the insertion holes in the pivot section of the heating area by taking advantage of the return force of the elastic rod.

1 Claim, 5 Drawing Sheets

STRUCTURE FOR WARMING CUPS IN A COFFEE MAKER

BACKGROUND OF THE INVENTION (1) Field of the Invention

The present invention relates to a structure for warming cups in a coffee maker, and more particularly to one having pivoted a lid to the heating area of the coffee pot to help keeping the heat in lukewarm and prevent ingression by dust or insects for achieving objectives of keeping lukewarm, preventing burns, fast accessible, and assurance of drinking sanitary and safety.

(2) Description of the Prior Art

In addition to seeking fast and convenient in making coffee, people are more conscious of demanding clean and sanitary of the coffee cup, even of having the coffee cup to be warmed up before filling in the coffee. Therefore, a warming panel is provided on the lid of a coffee maker to warm up the coffee cup and keep the made coffee in lukewarm. However, as the warming panel is exposed out of the top of the coffee maker, the coffee could get cool quickly and waste of power consumption while the coffee cup is vulnerable to be contaminated by dust, insects or other foreign matters. Furthermore, the warming panel is not adapted with any protection and one may easily get burnt.

SUMMARY OF THE INVENTION

The primary purpose of the present invention is to provide an improved structure for a coffee pot adapted to a coffee maker that allows fast use and cleaning, keeps the coffee in lukewarm for a longer period, prevents ingression of foreign matters including dust and insects to achieve the objectives of keeping lukewarm, preventing burns, and assurance of safe and sanitary drinking of coffee.

DETAILED DESCRIPTION OF THE PREFERRED EMBODIMENTS

Figure 1:
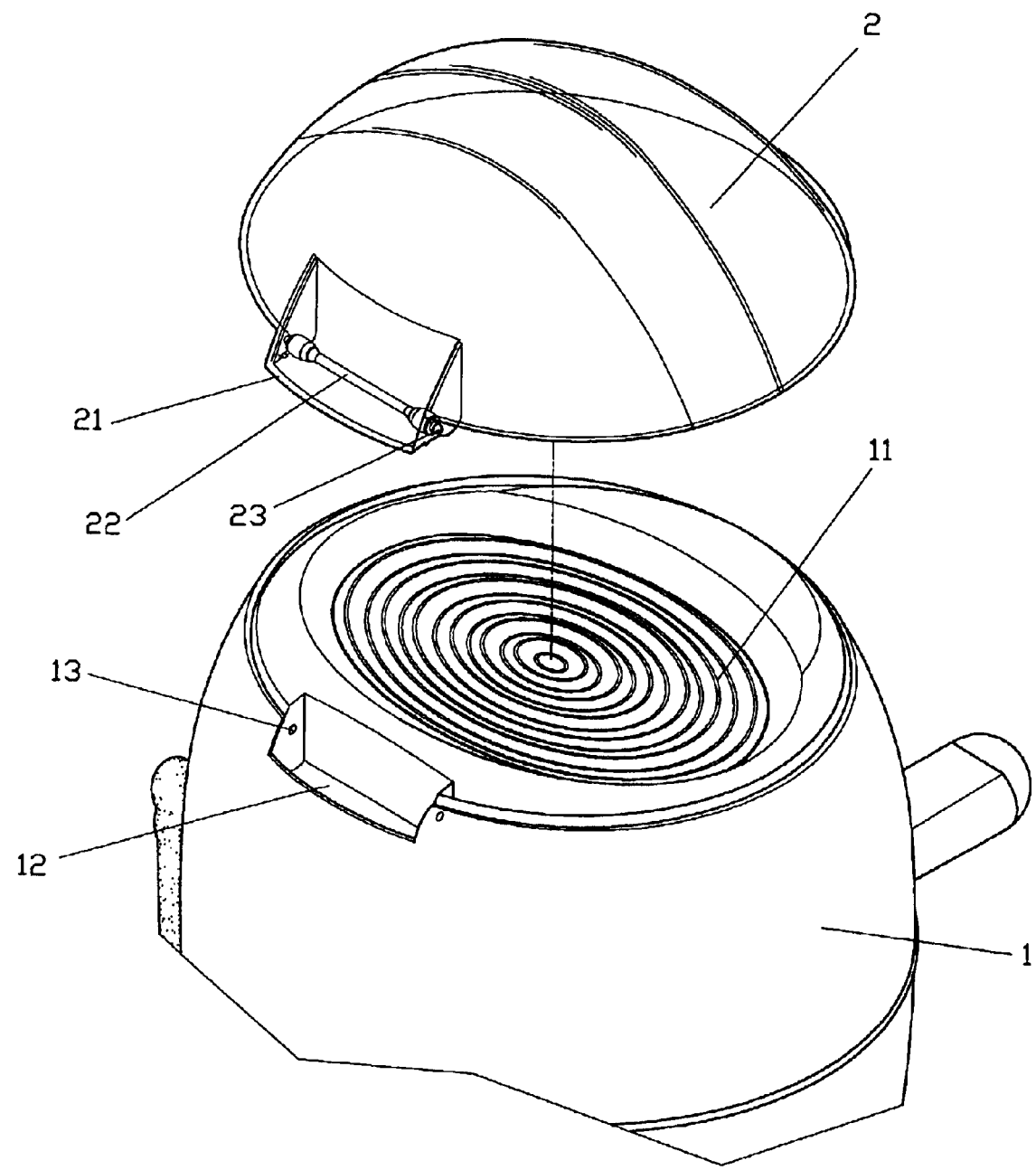
FIG. 1 is a perspective view of a preferred embodiment of the present invention.
Figure 2:
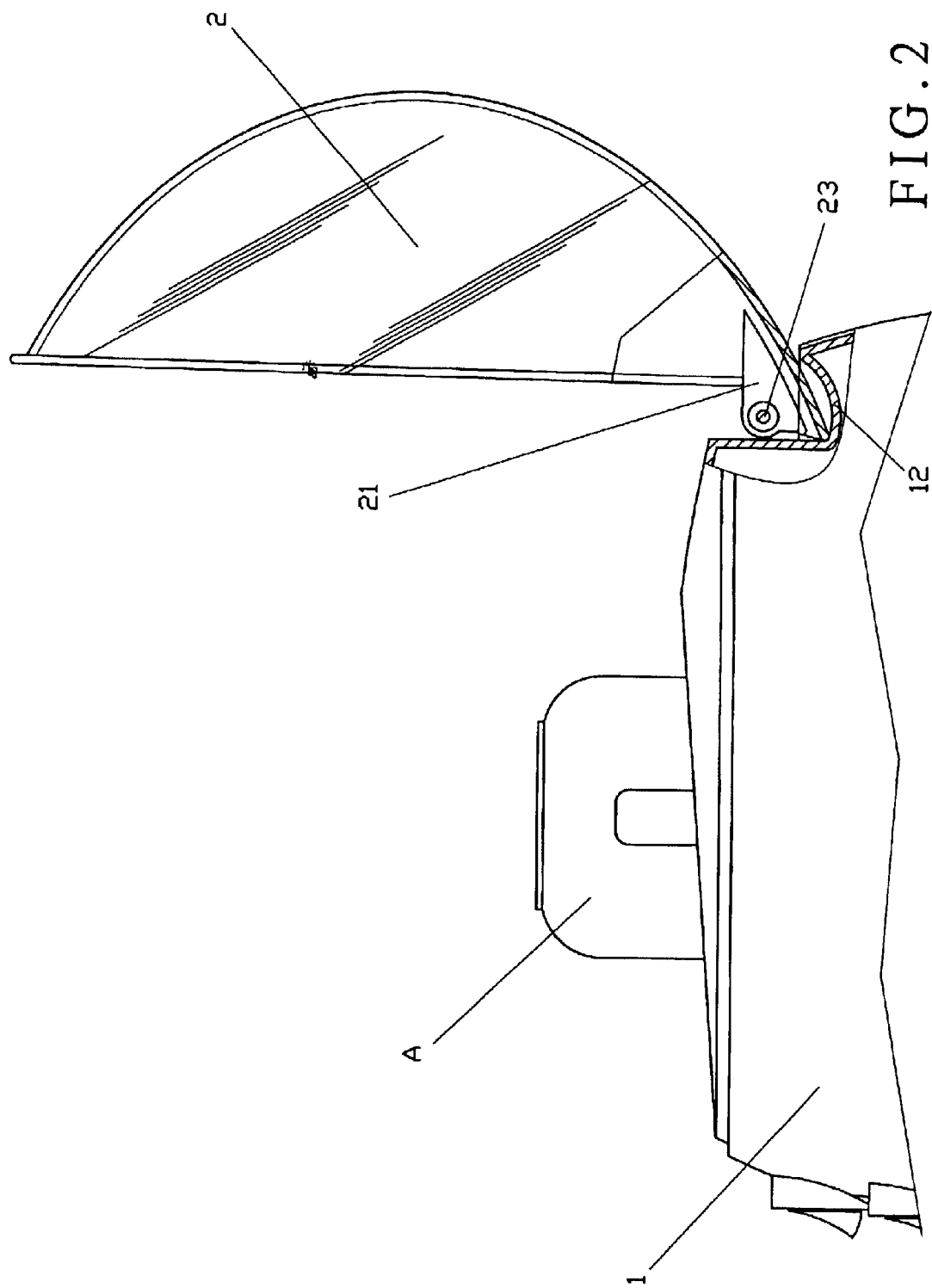
FIG. 2 is a view of an assembly of the preferred embodiment of the present invention.
Figure 5:
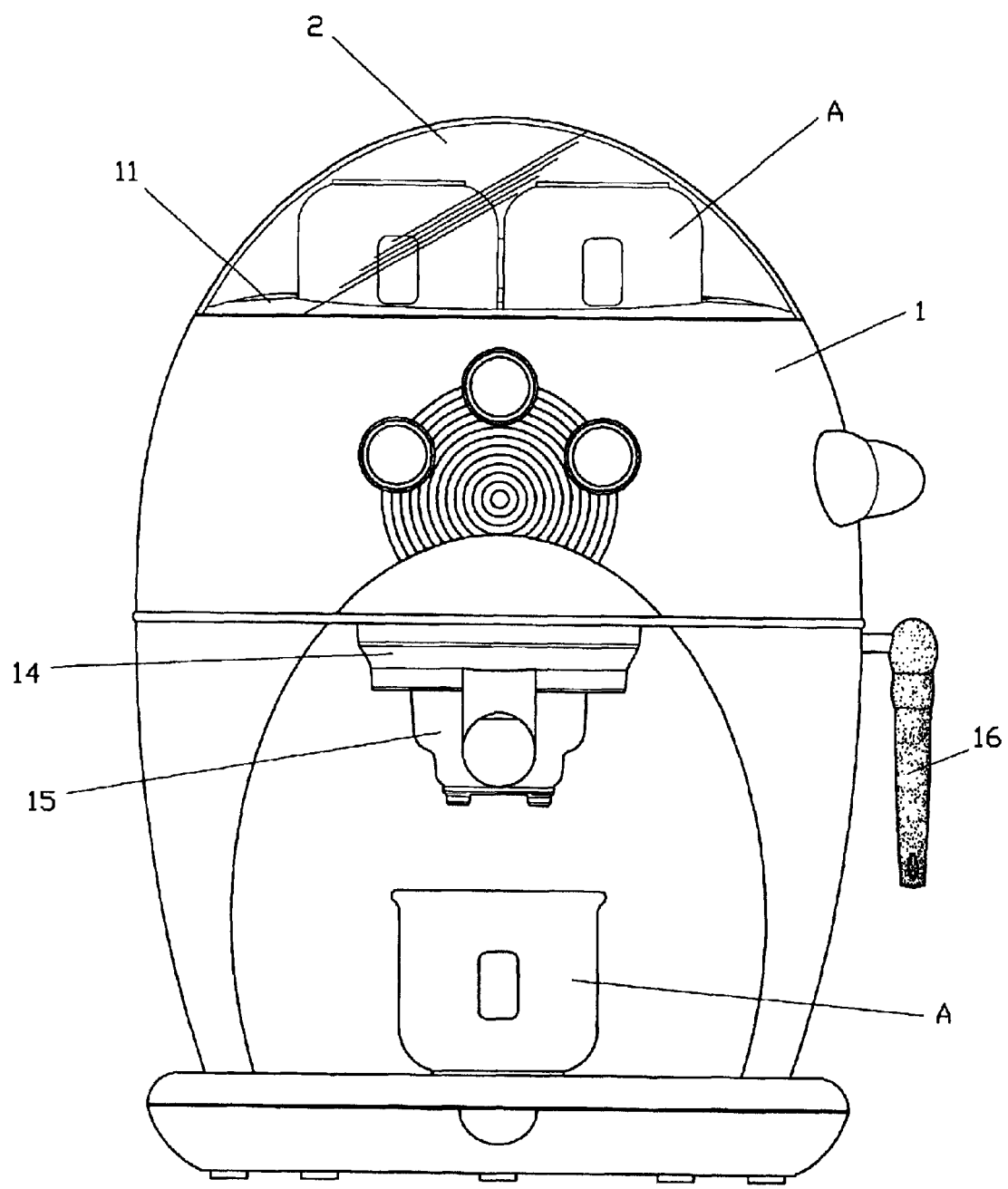
FIG. 5 is a side view showing that the preferred embodiment of the present invention is in use.

Referring to FIGS. 1 and 2, a preferred embodiment of the present invention essentially comprises a pot (1) and a lid (2). A heating area (11) is located over the pot (1). A pivot section (12) is provided in a recess in the rear of the heating area (11). An insertion hole (13) is respectively provided on both side walls of the pivot section (12). An outlet (14), as illustrated in FIG. 5, is provided in the front of the pot (1), a coffee basket (15) is provided below the outlet (14) and a steam release (16) is provided on one side of the pot (1).

The lid (2) is pivoted to the pivot section (12) of the heating area (11) above the pot (1). The lid (2) is made of see-through material and another pivot section (21) protrudes from the rear of the lid (2). An elastic rod (22) is sandwiched between both sidewalls of the pivot section (21), and both ends of the elastic rod (22) are respectively provided with a protruded insertion bead (23).

Figure 3:
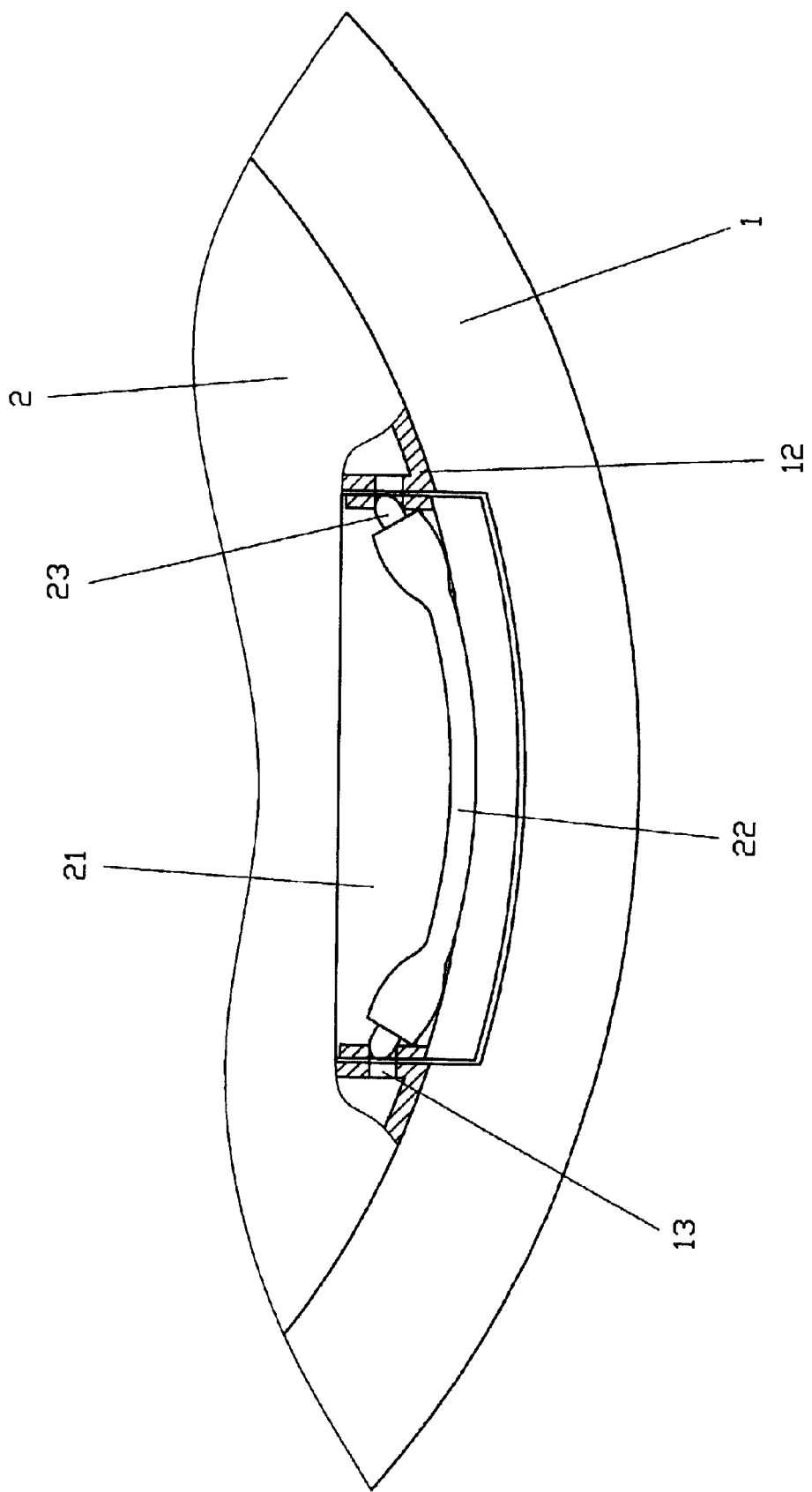
FIG. 3 is a view showing a depression of an elastic rod of the preferred embodiment of the present invention.
Figure 4:
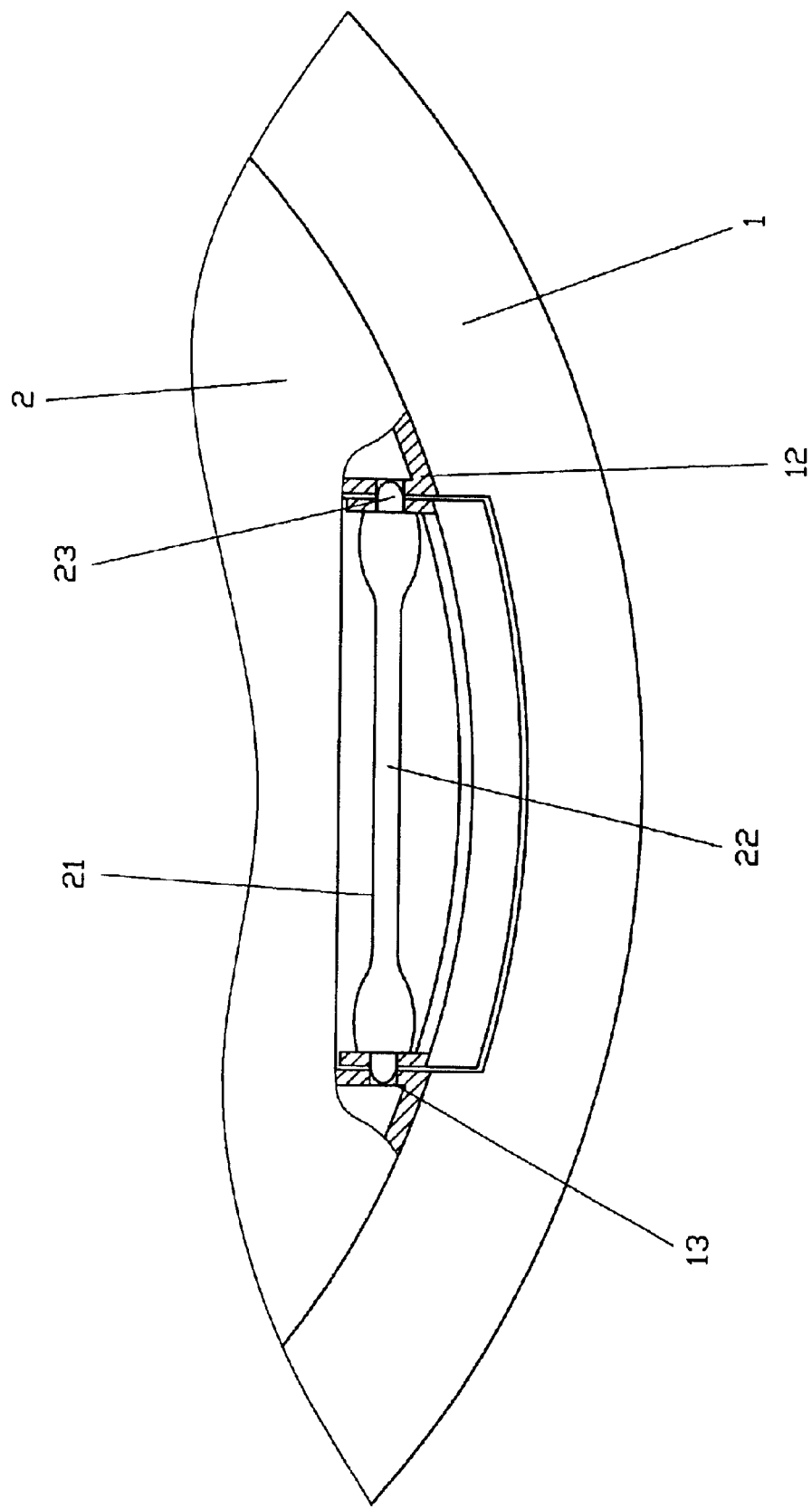
FIG. 4 is a view showing the elastic rod of the preferred embodiment of the present invention as assembled.

When assembled as illustrated in FIG. 3, the elastic rod (22) of the lid (2) is depressed for the elastic rod (22) to contract under compression so that the two insertion beads (23) respectively protruding from both ends of the elastic rod (22) retreat into both side walls of the pivot section (21). Meanwhile, the pivot section (21) of the lid (2) is placed inside the pivot section (12) of the pot (1) for both insertion beads (23) from both ends of the elastic rod (22) to aim at the corresponding insertion holes (13) inside both sidewalls of the pivot section (12) of the pot (1). Finally, the elastic rod (22) is released and both of said insertion beads (23) are immediately inserted into the corresponding insertion holes (13) on both side walls of the pivot section (12) of the pot (1), as illustrated in FIG. 4. The elastic rod (22) is fast pivoted in position for the lid (2) to be rapidly opened or closed.

When in use as illustrated in FIG. 4, water is filled into a water tank of the pot (1) for making coffee and generating steam, then the coffee powder is filled into the coffee basket (15) by allowing the hot water to pass through the basket (15). Upon finishing the making of coffee, the coffee flows out of the coffee basket (15) while steam is erupted from the steam release (16), and milk is provided below the release (16) to be added into the coffee for drinking. Furthermore, the lid (1) on top of the pot (1) is opened up and a coffee cup (A) is placed within the heating area (11), and then the lid (2) is closed up to warm up the coffee cup (A) so to make the coffee even more fragrant for drinking while leaving the coffee not yet consumed on the heating area (11) to keep it in lukewarm and to prevent ingression of foreign matters including dust and insects. Therefore, it is assured of having always the good and clean coffee to drink while avoiding burns by contacting the heating area. When the lid (2) requires cleaning, the elastic rod (22) of the lid (2) is depressed for both of said insertion beads (23) respectively provided at both ends of the elastic rod (22) to retreat into both side walls of the pivot section (21) of the lid (2) to clear away from both insertion holes (13) provided in both side walls of the pivot section (12) of the pot (1), then the lid (2) can be easily separated from the pot (1). When washed to clean, the lid (2) is mounted in reverse order.

As disclosed above, the preferred embodiment of the present invention provides the following advantages:

1. A lid is pivoted to where above the heating area of a pot to provide shading effect for preventing loss of heat and burns, ingression of foreign matters including dust and insects, thus to assure of safe and sanitary drinking of fragrant and lukewarm coffee, and avoiding to get burnt by accidental contact of the heating area.

2. With the presence of an elastic rod provided with return force to the lid, and two insertion beads respectively provided at both ends of the elastic rod, it permits fast insertion of the elastic rod into insertion holes provided in a pivot section of the heating area to facilitate removing the lid either for use, cleaning or replacement.

What is claimed is:

1. A coffee maker having a structure for warming cups, said structure comprising a pot having a heating area formed in an upper portion thereof and a lid hingedly coupled to said pot to form a closure for said heating area, said pot having a first pivot section formed therein, said first pivot section having a pair of opposing sidewalls and each sidewall has an insertion hole formed therein, said lid having a second pivot section formed therein, said second pivot section having a pair of opposing end walls with a pair of insertion openings respectively formed therethrough and an open cavity extending between said end walls, said lid including a longitudinally extended elastic rod disposed in said cavity and having a pair of insertion beads respectively extending from opposing longitudinal ends thereof, each of said insertion beads extending through a respective one of said insertion openings and into a corresponding insertion hole aligned therewith, said elastic rod being elastically deflectable by a user in a direction transverse said longitudinal direction to withdraw said pair of insertion beads from said insertion holes and thereby release said lid from said pot.

* * * * *